(12) United States Patent
Fujimura

(10) Patent No.: US 8,060,898 B2
(45) Date of Patent: Nov. 15, 2011

(54) HEAD DRIVING DEVICE AND DISK APPARATUS

(75) Inventor: Nobuhiko Fujimura, Hachioji (JP)

(73) Assignee: TEAC Corporation, Tama-shi, Tokyo (JP)

( * ) Notice: Subject to any disclaimer, the term of this patent is extended or adjusted under 35 U.S.C. 154(b) by 435 days.

(21) Appl. No.: 12/431,679

(22) Filed: Apr. 28, 2009

(65) Prior Publication Data

US 2009/0276797 A1 Nov. 5, 2009

(30) Foreign Application Priority Data

Apr. 30, 2008 (JP) ................................. 2008-118693

(51) Int. Cl.
*G11B 7/00* (2006.01)
(52) U.S. Cl. ........ 720/679; 720/684; 720/687; 720/688; 720/692
(58) Field of Classification Search .................. 720/675, 720/676, 677, 679, 684, 687, 688, 692
See application file for complete search history.

(56) References Cited

U.S. PATENT DOCUMENTS

2008/0320507 A1* 12/2008 Katou et al. .................. 720/675

FOREIGN PATENT DOCUMENTS

JP 2004-334943 A 11/2004

* cited by examiner

*Primary Examiner* — Hoai V Ho
*Assistant Examiner* — Pablo Huerta
(74) *Attorney, Agent, or Firm* — Seed IP Law Group PLLC

(57) ABSTRACT

A pickup head is provided with a second shaft receiving section. A cutout is formed in the second shaft receiving section. A sub shaft supports the pickup head in a movable manner via the second shaft receiving section. A diameter of the sub shaft is smaller than the size of the cutout. A retainer is attached between the second shaft receiving section and the sub shaft. The retainer includes a body section and a pressing section. The body section enters the cutout in a state that a slide groove of the body section slidably fits to the sub shaft. The pressing section is elastically deformed upon contact with the sub shaft when the body section enters the cutout, and biases the second shaft receiving section via the body section such that a lower surface of the cutout is pressed against the sub shaft.

9 Claims, 7 Drawing Sheets

HEAD DRIVING DEVICE AND DISK APPARATUS

FIELD OF THE INVENTION

The present invention relates to a head driving device and a disk apparatus which move a pickup head along a guide shaft to read and write information on a disk.

BACKGROUND OF THE INVENTION

A disk apparatus for reading and writing high-density data on a disk is known. The disk apparatus reads and writes data by moving a pickup head while the disk loaded on a turntable is spinned.

The turntable is supported on a lifting frame that moves up and down in a body chassis of the disk apparatus. The pickup head is supported by a guide shaft fixed to the lifting frame, and moves along the guide shaft in a radial direction of the disk. The lifting frame is in a down position when a disk is unloaded. After a disk is inserted, the lifting frame moves up and the disk is loaded onto a chucking head of the turntable. Thereby, the disk apparatus is ready to read or write data on the disk.

Slimming down of such disk apparatus has been promoted. However, if the disk apparatus is made excessively slim, the guide shaft may interfere with a bottom plate of a body chassis when the lifting frame is moved up and down. To slim down the disk apparatus and prevent interference between the guide shaft and the bottom plate, it is necessary to reduce the diameter of the guide shaft. However, the diameter of the guide shaft is formed in accordance with a shape of a shaft receiving section provided in the pickup head. When the diameter of the guide shaft is only reduced, the pickup head may become unsteady. On the other hand, changing the shape of the pickup head to cope with the slimming down of the disk apparatus requires a custom-ordered pickup head and causes significant cost increase.

To solve the above problems, in Japanese Patent Laid-Open Publication No. 2004-334943, a leaf spring is attached to a pickup head. A guide shaft inserted through a shaft receiving section is pressed against the shaft receiving section with the leaf spring. Thereby, the pickup head is kept steady even if it is a conventional pickup head and the guide shaft has a smaller diameter than the shaft receiving section.

In the above publication, the leaf spring needs to be fixed to the pickup head with screws or adhesives, requiring time and effort to assemble the disk apparatus. As a result, assemblability of the disk apparatus decreases and assembly costs increase. In addition, since the guide shaft is pressed only with the leaf spring, unsteadiness (shake) of the pickup head is not surely prevented when the diameter of the guide shaft is excessively smaller than the shape of the shaft receiving section. Such unsteadiness causes fluctuations in the optical axis of laser beams from the pickup head, resulting in reading and writing errors. Recently, a technology to draw patterns and letters on a disk surface with laser beams from the pickup head has been developed, and it requires high precision mechanisms in the disk apparatus so as to perform drawing with high resolution.

To prevent unsteadiness of the pickup head, a collar may be provided between the guide shaft and the guide shaft receiving section to fill a gap therebetween. However, high processing precision is necessary in producing the collars capable of surely preventing the unsteadiness, resulting in increase in production costs.

SUMMARY OF THE INVENTION

A main object of the present invention is to provide a head driving device and a disk apparatus that surely prevents unsteadiness of a pickup head even if a guide shaft with a diameter smaller than a shape of a shaft receiving section is used.

Another object of the present invention is to provide a head driving device and a disk apparatus that do not cause reduction in assemblability and increase in costs.

In order to achieve the above objects and other objects, a head driving device and a disk apparatus of the present invention include a shaft receiving section and a guide shaft retainer. The shaft receiving section is supported by the guide shaft. The guide shaft retainer is attached to the shaft receiving section. The shaft receiving section has a cutout with a first surface and a second surface for receiving the guide shaft. A distance between the first surface and the second surface is larger than a diameter of the guide shaft. The guide shaft retainer has a body section and a pressing section. The body section has a slide groove to slidably fit to the guide shaft. The pressing section is located opposite to the first surface with respect to the guide shaft. The pressing section biases the shaft receiving section via the body section such that the first surface is pressed against the guide shaft when the pressing section is elastically deformed by the guide shaft.

In a preferred embodiment of the present invention, the pressing section is elastically deformed upon contact with the guide shaft when the body section enters the cutout in a state that the guide shaft fits into the slide groove. With the elastic force of the pressing section caused by this elastic deformation, the body section is pressed against the second surface and the first surface is pressed against the guide shaft.

It is preferred that the pressing section is provided on each lateral side of the body section. It is preferred that each pressing section is a plate projected from the body section. The cutout is opened in a lateral direction, and the slide groove is opened in an up-and-down direction. The cutout has a U-shape. The body section has a concave portion that engages with the second surface of the cutout. It is preferred that the guide shaft retainer is a polymer molded part.

In the present invention, the guide shaft retainer presses the first surface of the cutout formed in the shaft receiving section against the guide shaft. Therefore, even if the diameter of the guide shaft is smaller than the cutout, unsteadiness (shake) of the pickup head is prevented. Thus, according to the present invention, a disk apparatus is slimmed down even though the conventional pickup head is used.

Since the body section fits to the guide shaft via the slide groove, and then is attached to the shaft receiving section such that the slide groove is placed inside the cutout, the body section fills a gap between the cutout and the guide shaft. Thereby, unsteadiness of the pickup head is prevented even if the size of the guide shaft is excessively smaller than the cutout. Since the guide shaft retainer is fixed simply by fitting the slide groove to the guide shaft and engaging the body section with the shaft receiving section, screws and adhesives are unnecessary. Therefore, reduction in assemblability and increase in assembly costs are prevented.

Since the guide shaft retainer elastically deforms the pressing section and the first surface of the cutout is pressed against the guide shaft, such guide shaft retainer has a wider range of dimensional tolerance when compared to a collar. In other words, high processing precision is unnecessary for the guide shaft retainer. As a result, there is no increase in production costs.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
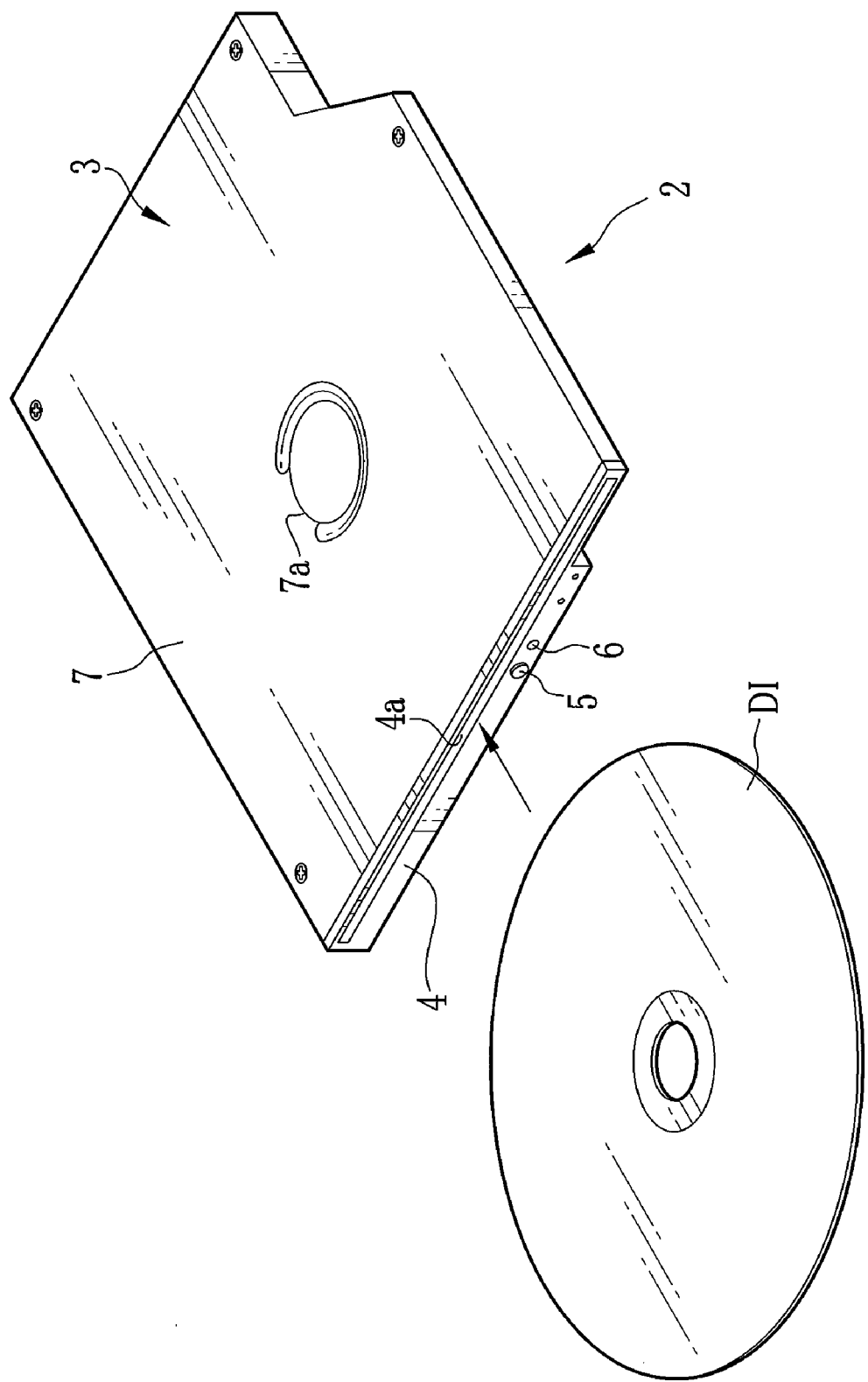
FIG. 1 is a perspective view of a disk apparatus of the present invention.

In FIG. 1, a disk apparatus 2 includes a body chassis 3. The body chassis 3 is well shielded. A bezel 4 is attached to the front of the body chassis 3. The bezel 4 has a slot 4a, an eject button 5, and an indicator 6. A disk DI is inserted in the disk apparatus 2 through the slot 4a. The disk DI is ejected by pushing the eject button 5. The indicator 6 indicates an operating status of the disk apparatus 2.

The body chassis 3 is provided with a top panel 7. An opening 7a is formed at an approximate center of the top panel 7. A chuck head 16 (see FIG. 2) slightly enters the opening 7a when the disk DI is chucked.

Figure 2:
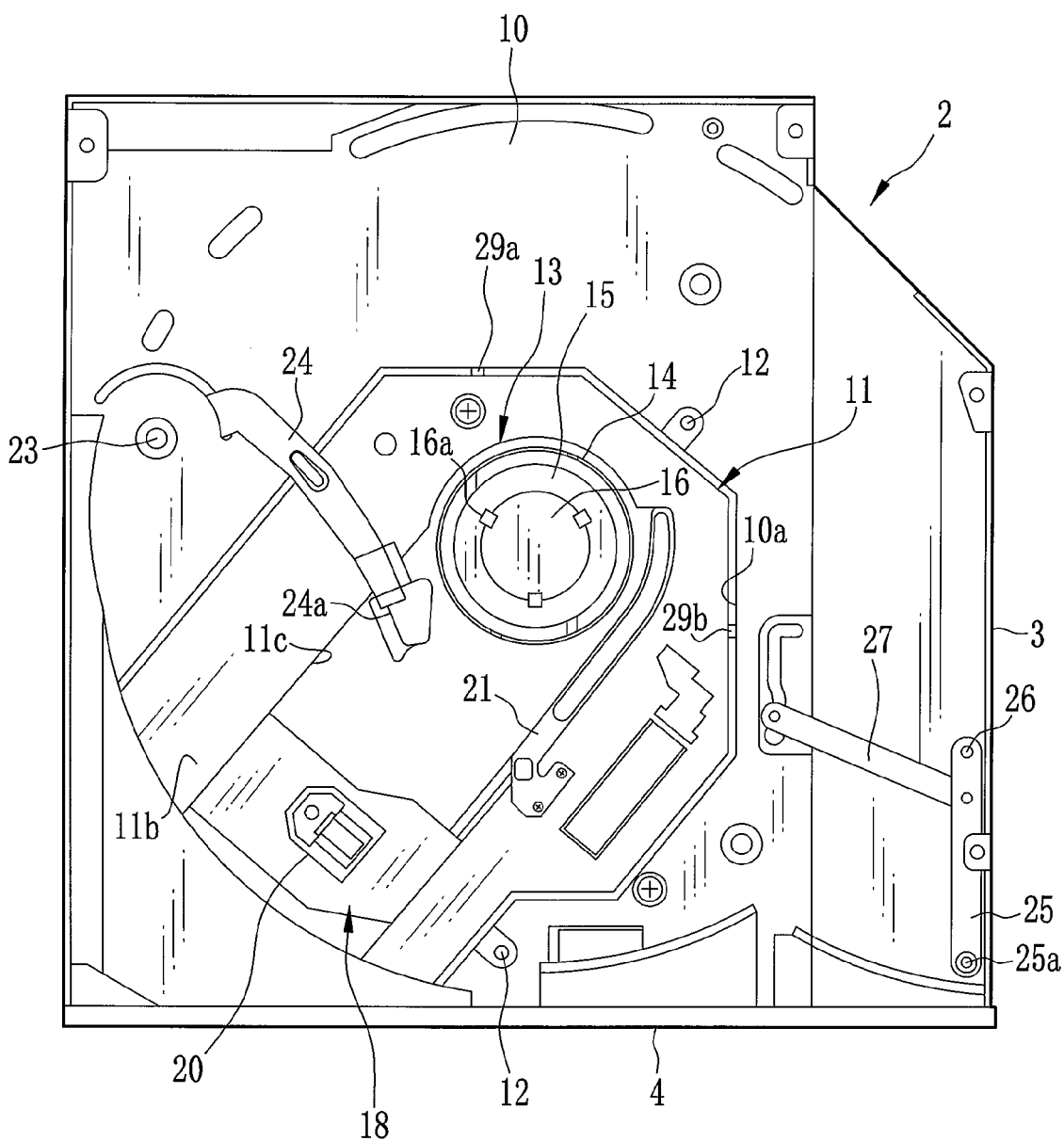
FIG. 2 is a top view of the disk apparatus from which a top panel is removed.

In FIG. 2, a base panel 10 is provided inside the body chassis 3. The base panel 10 is fixed to the body chassis 3 to partition the inside of the body chassis 3 into upper and lower regions. An opening 10a is formed in the base panel 10, and extends diagonally from the center. A lifting frame 11 is disposed in the opening 10a. The lifting frame 11 includes a frame body 11a (see FIG. 3) and a frame cover 11b. The frame body 11a is formed by sheet metal pressing, for example. The frame cover 11b is attached to a top surface of the frame body 11a. An opening 11c is formed on the frame cover 11b, and extends diagonally from the center.

The lifting frame 11, supported on the bezel 4 side, moves up and down its distal end portion located at the center of the body chassis 3 when the disk DI is loaded or unloaded into or from the body chassis 3. To relieve the impact of the lifting frame 11 in moving up and down, the lifting frame 11 is attached to the base panel 10 at several points through cushioning support mechanisms 12. Each cushioning support mechanism 12 has a shaft extending from a bottom plate of the body chassis 3 to the base panel 10, and a rubber ring through which the shaft is inserted.

A turntable unit 13 is attached to the distal end portion of the lifting frame 11. The turntable unit 13 includes a spindle motor 14, a turntable 15, and the chuck head 16. The spindle motor 14 is fixed inside the lifting frame 11. The turntable 15 is fixed to a drive axis of the spindle motor 14. The chuck head 16 is integrally formed with the turntable 15. The chuck head 16 chucks the disk DI in a chuck position when the lifting frame 11 moves up. The chuck head 16 is provided with chuck claws 16a each biased by a spring to detachably hold the disk DI.

A pickup head 18 is movably attached to the lifting frame 11. A pickup 20 is provided in the pickup head 18. To read or write data on the disk DI, a head driving device moves the pickup head 18 along the opening 11c in a radial direction of the disk DI while the pickup 20 irradiates laser beams onto a recording surface of the disk DI.

The lifting frame 11 is provided with a disk guide 21 that guides the underside of the disk DI. The disk guide 21 extends close to the turntable 15 along a loading direction of the disk DI. A slope is formed on the disk guide 21. The slope gradually increases toward the front end (distal end in the insertion direction of disk DI). The slope raises and guides the inserted disk DI to a holder 24a of a disk support arm 24 to load the disk DI in the body chassis 3 without making contact with the chuck head 16.

On the base panel 10, the disk support arm 24 and a guide arm 25 are swingably provided. The disk support arm 24 loads and unloads the disk DI into and from the body chassis 3. The guide arm 25 guides the disk DI inserted through the slot 4a into the body chassis 3. The disk support arm 24 supports the front end, that is, a distal end of the disk DI in the insertion direction with the holder 24a and swings about a pivot 23. The guide arm 25 supports the rear end of the disk DI with a flange roller 25a and swings about a pivot 26. A link lever 27 is connected to the guide arm 25 to swing the guide arm 25.

The disk support arm 24, the guide arm 25, and the link lever 27 are driven by a known slider mechanism (not shown) provided on the back side of the base panel 10. A disk loading mechanism is constituted of the disk support arm 24, the guide arm 25, the link lever 27, and the slider mechanism driven by a motor (not shown), and loads or unloads the disk DI. The disk loading mechanism moves the lifting frame 11 between the down position and the up position (reading and writing position) via pins 29a and 29b provided in the lifting frame 11.

Figure 3:
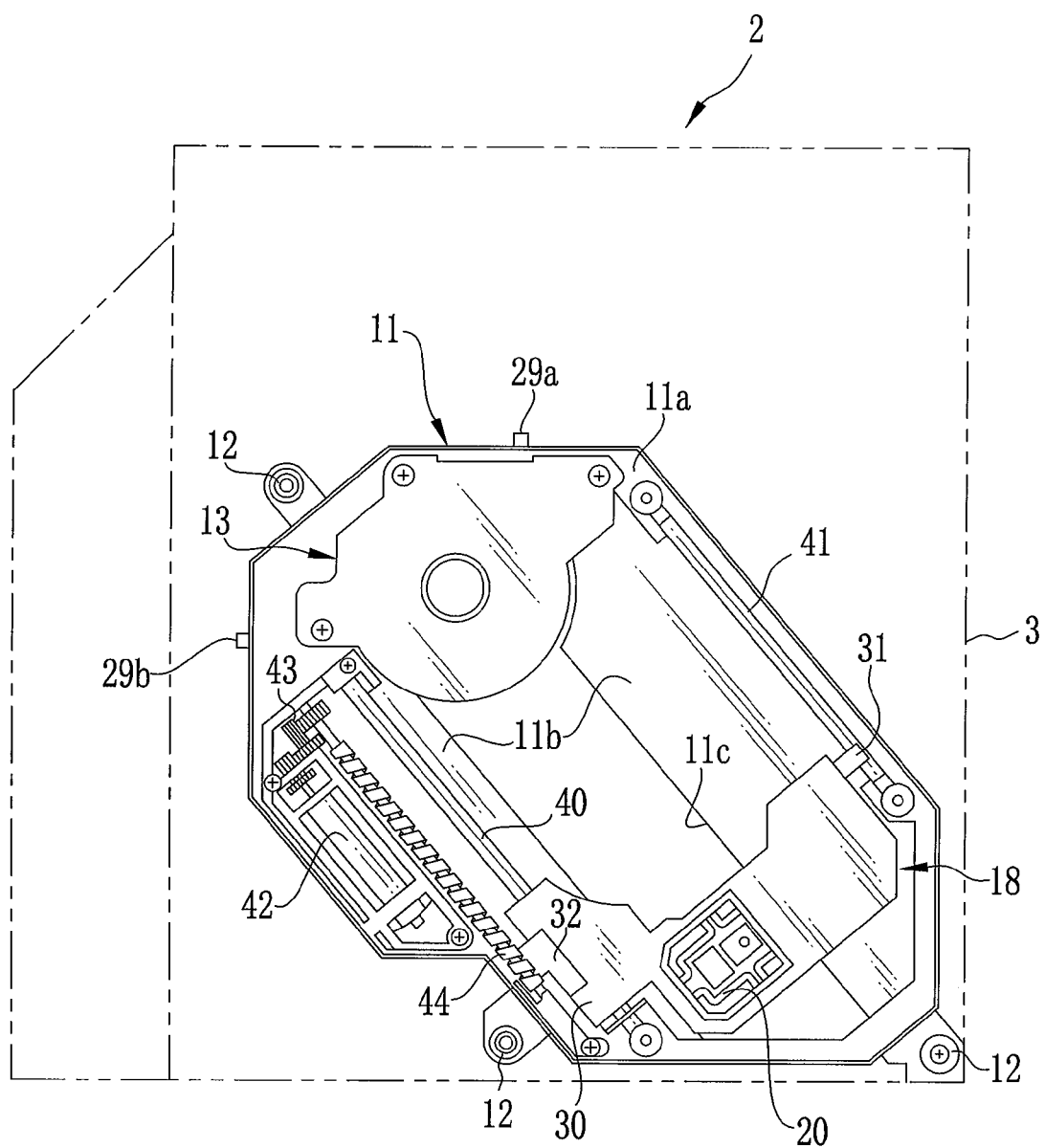
FIG. 3 is a bottom view of the disk apparatus whose bottom panel is omitted.

Next, referring to FIG. 3, a head driving device is described. A pair of round-rod guide shafts, a main shaft 40 and a sub shaft 41, are attached to the back of the frame body 11a. The main and sub shafts 40 and 41 are disposed substantially parallel to a direction of the opening 11c (the radial direction of the disk DI). A first shaft receiving section 30 and a second shaft receiving section 31 are formed in the pickup head 18. The first shaft receiving section 30 receives the main shaft 40. The second shaft receiving section 31 receives the sub shaft 41. The main and sub shafts 40 and 41 movably supports the pickup head 18 via the first and second shaft receiving sections 30 and 31.

In addition to the turntable unit 13, a thread motor 42, a gear train 43, a lead screw 44, and the like are fixed to the back of the frame body 11a. The gear train 43 transmits a drive force of the thread motor 42 to the lead screw 44 and rotates the lead screw 44. The lead screw 44 is fixed parallel to the main shaft 40 in the vicinity of the main shaft 40. The lead screw 44 engages with teeth 32 provided in the first shaft receiving section 30 of the pickup head 18. As the lead screw 44 is rotated by the thread motor 42, the pickup head 18 moves in the radial direction of the disk DI.

Figure 4:
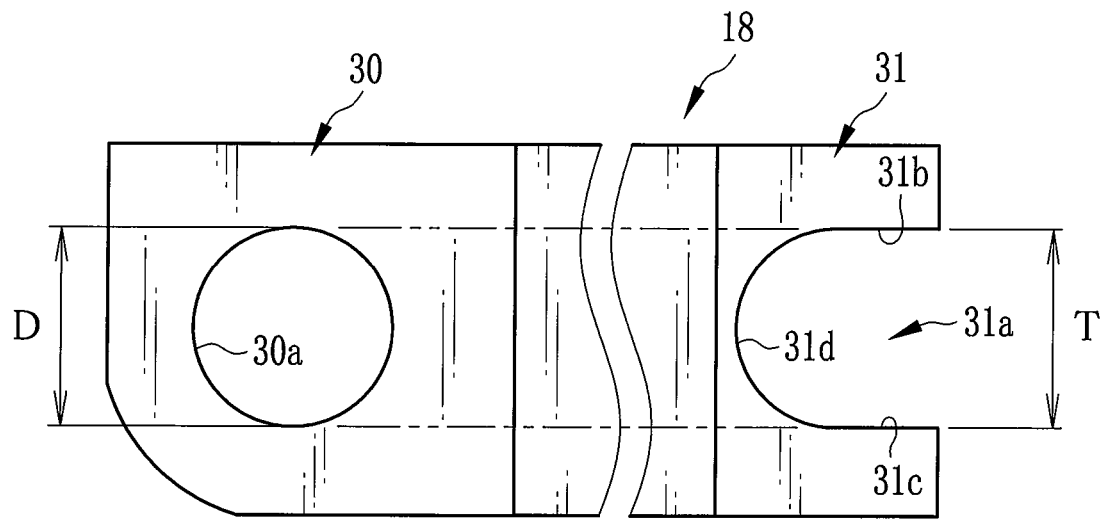
FIG. 4 is an explanatory view of a first shaft receiving section and a second shaft receiving section.

As shown in FIG. 4, the first shaft receiving section 30 is formed with a substantially circular through hole 30a through which the main shaft 40 is inserted. The second shaft receiving section 31 is formed with a cutout 31a to which the sub shaft 41 enters. The cutout 31a is substantially U-shaped and opened in a lateral direction. The cutout 31a has a flat upper surface (second surface) 31b, a flat lower surface (first surface) 31c, and a semi-cylindrical end surface 31d. A diameter D of the through hole 30a and a width T of the cutout 31a are substantially the same size. The width T is a distance between the upper surface 31b and the lower surface 31c. The diameter D and the width T are, for example, 3 mm each.

Figure 5:
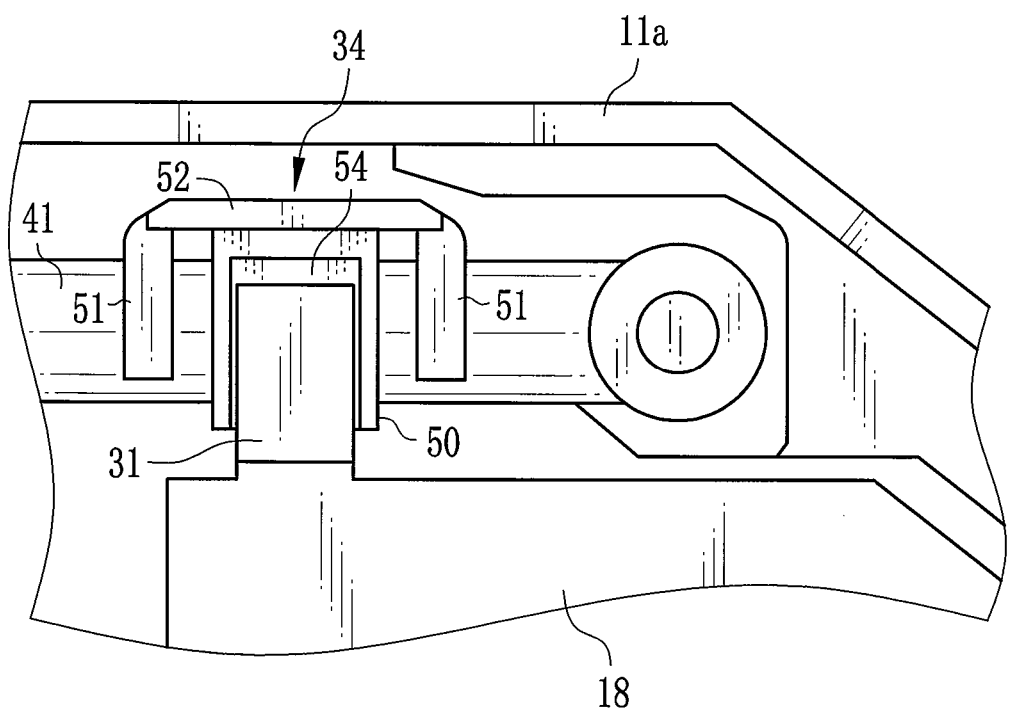
FIG. 5 is a partially enlarged view of a retainer being attached to the second shaft receiving section.

The main shaft 40 has a slightly smaller diameter than the diameter D of the through hole 30a. On the other hand, the sub shaft 41 has a smaller diameter, for example, 2.5 mm, than the diameter of the main shaft and the width T of the cutout 31a. As shown in FIG. 5, a retainer (collar) 34 is attached between the second shaft receiving section 31 and the sub shaft 41. The retainer 34 prevents unsteadiness (shake) of the pickup head 18 caused by a gap between the cutout 31a and the sub shaft 41. In FIG. 3, illustration of the retainer 34 is omitted for the sake of convenience.

Figure 6:
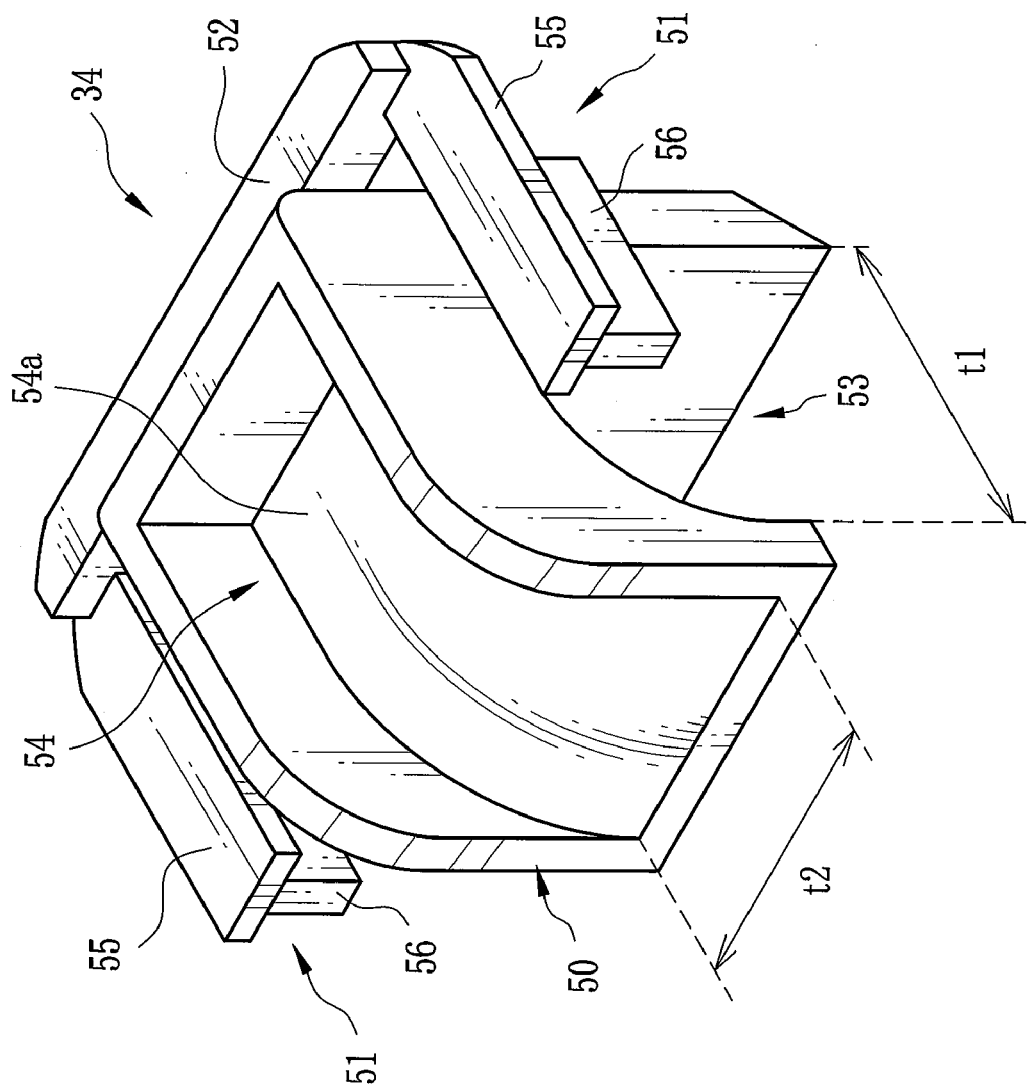
FIG. 6 is a perspective view of the retainer.

As shown in FIG. 6, the retainer 34 includes a body section 50, a pair of pressing sections 51, and a connector 52. The pressing sections 51 are disposed on both sides of the retainer 34. The connector 52 connects the pressing sections 51 to the body section 50. The retainer 34 is made of polymer material. The body section 50, the pair of pressing sections 51, and the connector 52 are formed integrally into one polymer molded part by a known molding method.

The body section 50 has a slide groove 53 facing downward, and has a substantially U-shaped outline. A width t1 of the slide groove 53 is substantially the same as the diameter of the sub shaft 41. The body section 50 slidably fits to the sub shaft 41 through the slide groove 53. A concave portion (engaging portion) 54 is formed on an outer surface of the body section 50. The concave portion 54 has a concave surface 54a along the curved outer surface. A width t2 of the concave surface 54a is substantially the same as a width of the second shaft receiving section 31.

The body section 50 enters the cutout 31a of the second shaft receiving section 31 such that the slide groove 53 is placed inside the cutout 31a in a state that the sub shaft 41 fits into the slide groove 53. Thus, the retainer 34 is attached to the second shaft receiving section 31 without screws or adhesives. As a result, reduction in assemblability and increase in assembly costs are prevented. It should be noted that the main shaft 40 is inserted through the first shaft receiving section 30 of the pickup head 18 after the sub shaft 41 is set in the second shaft receiving section 31. Next, the main shaft 40 and the sub shaft 41 are attached to the lifting frame 11.

When the body section 50 is attached to the second shaft receiving section 31, the concave portion 54 engages with a part of the second shaft receiving section 31 (see FIG. 5). This engagement allows the retainer 34 to slide on the sub shaft 41 with the pickup head 18 when the pickup head 18 is moved by the thread motor 42.

Each of the pressing sections 51 includes a first plate 55 and a second plate 56. An end of the first plate 55 is connected to the connector 52. The second plate 56 projects downward from the bottom of the first plate 55. The first plate 55 is placed substantially orthogonal to a direction in which the slide groove 53 is formed. An amount of the projection of the second plate 56 from the first plate 55 is adjusted such that the second plate 56 comes in contact with the sub shaft 41 when the body section 50 fits in the cutout 31a.

Figure 7:
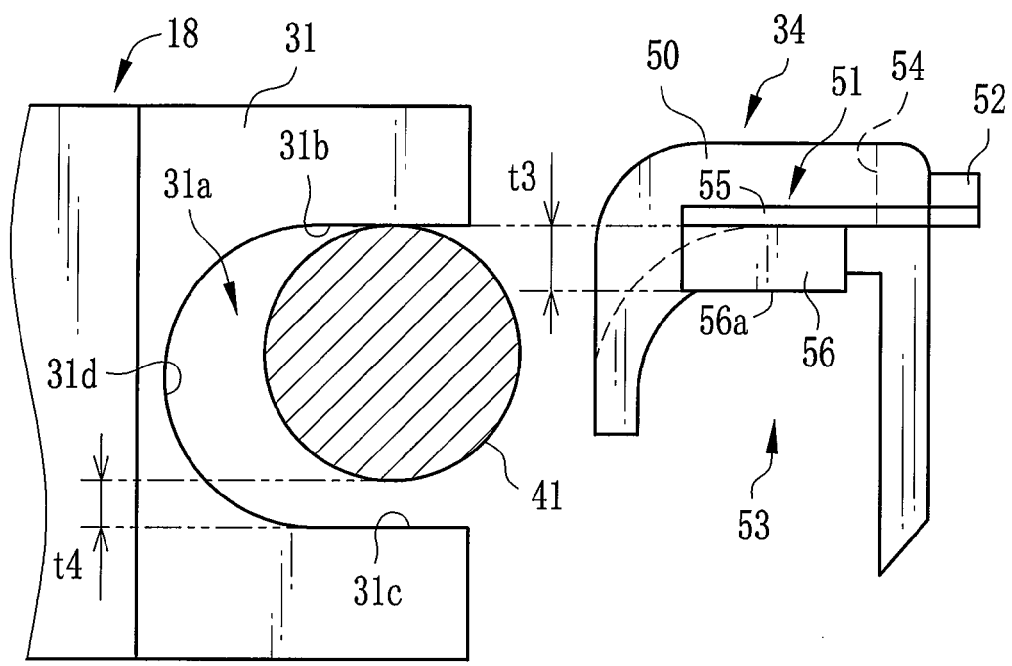
FIG. 7 is an explanatory view showing a difference between a distance between a concave surface of a body section and a bottom surface of a second plate, and a gap between a sub shaft and the second shaft receiving section.
Figure 8:
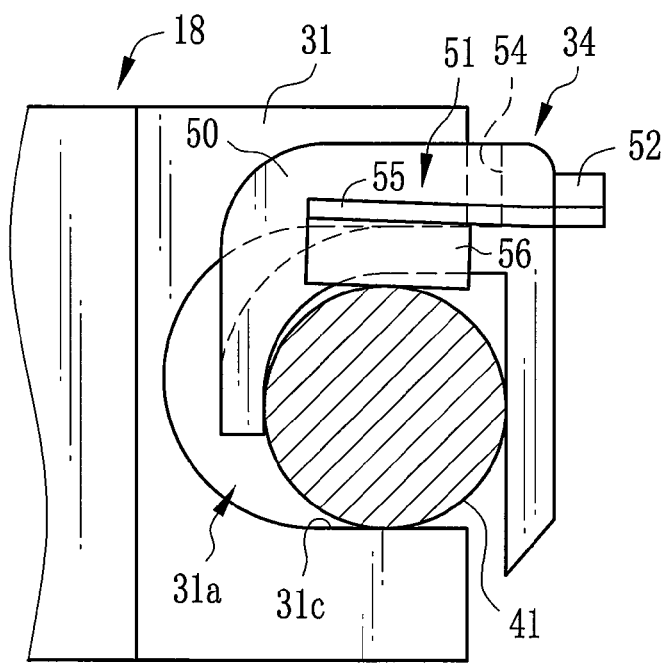
FIG. 8 is an explanatory view of a lower surface pressed against the sub shaft.
Figure 9:
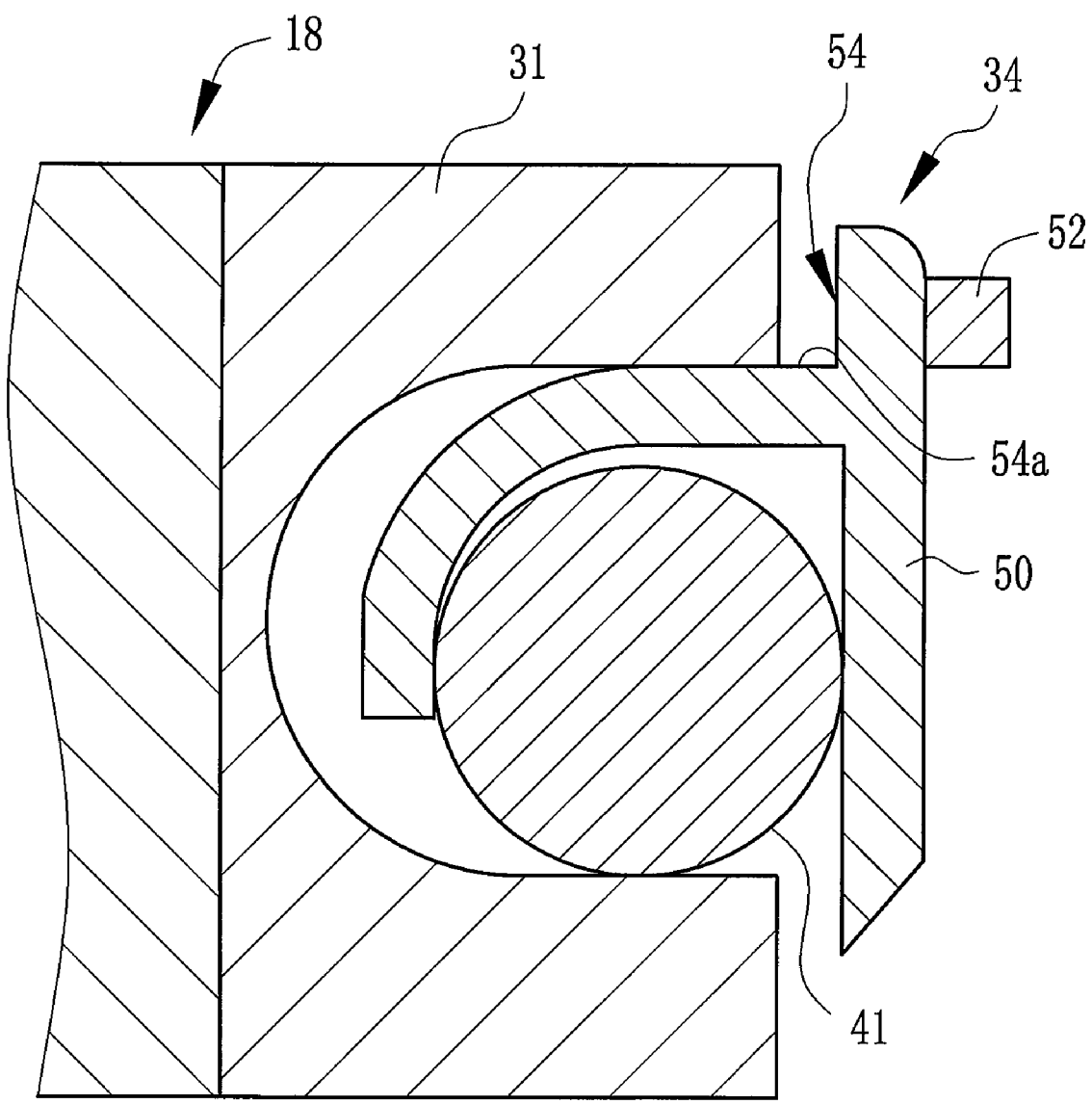
FIG. 9 is a cross sectional view of the lower surface pressed against the sub shaft.

As shown in FIG. 7, a distance t3 between the concave surface 54a of the body section 50 and a bottom surface 56a of the second plate 56 is slightly longer than a distance t4 of a gap between the sub shaft 41 and the lower surface 31c. As shown in FIGS. 8 and 9, when the body section 50 enters the cutout 31a in a state that the slide groove 53 fits to the sub shaft 41, the bottom surface 56a of the second plate 56 comes in contact with the sub shaft 41. Thereby, the first plate 55 is elastically deformed and biases the second shaft receiving section 31 via the body section 50 such that the lower surface 31b of the cutout 31a is pressed against the sub shaft 41.

With the elastic force of the pressing sections 51 caused by elastic deformation thereof, the concave surface 54a of the body section 50 is pressed against the upper surface 31b of the cutout 31a, and the lower surface 31c of the cutout 31a is pressed against the sub shaft 41. The elastic force of the pressing sections 51 is adjusted not to hinder the slide movement of the pickup head 18.

As described above, when the body section 50 is attached to the second shaft receiving section 31 such that the slide groove 53 is placed inside the cutout 31a in a state that the slide groove 53 slidably fits to the sub shaft 41, the pressing sections 51 are received by the sub shaft 41 and elastically deformed. With the elastic force, the lower surface 31c of the second shaft receiving section 31 is pressed against the sub shaft 41. Thus, the retainer 34 prevents the unsteadiness of the pickup head 18.

Since a gap between the cutout 31a and the sub shaft 41 is filled with the body section 50, the unsteadiness of the pickup head 18 is surely prevented even if the diameter of the sub shaft 41 is excessively smaller than the cutout 31a. Elastic deformation of the pressing sections 51 permits a wider range of dimensional tolerance compared to a common tube-like collar. In other words, the retainer 34 does not require high processing precision. As a result, there is no increase in production costs.

Next, an operation of the disk apparatus 2 of the above configuration is described. When the disk DI is not inserted, the lifting frame 11 is kept in the down position. The sub shaft 41 that is located farther from the swing axis of the lifting frame 11 than the main shaft 40 has a small diameter. Therefore, the main and sub shafts 40 and 41 do not interfere with the body chassis 3 even if the disk apparatus 2 using the conventional pickup head 18 is slimmed down.

When the disk DI is inserted in the slot 4a, the disk loading mechanism is actuated, and the disk DI is automatically carried into the body chassis 3. Then, the lifting frame 11 is moved up. Thereafter, the chuck head 16 chucks the disk DI.

Then, the spindle motor 14 spins the disk DI. At the same time, the thread motor 42 moves the pickup head 18 in a radial direction of the disk DI. Thereby, the pickup head 18 reads and/or writes data on the disk DI. The retainer 34 prevents the unsteadiness of the pickup head 18 when the pickup head 18 reciprocates along the main and sub shafts 40 and 41. Thus, the pickup head 18 irradiates laser beams onto a recording surface of the disk DI precisely.

In the above embodiment, the concave surface 54a of the body section 50 is pressed against the upper surface 31b of the second shaft receiving section 31, and the lower surface 31c of the second shaft receiving section 31 is pressed against the sub shaft 41. Conversely, the concave surface 54a may be pressed against the lower surface 31c, and the upper surface 31b may be pressed against the sub shaft 41. The body section 50 and the second shaft receiving section 31 may be pressed in any directions as necessary depending on the shapes of the second shaft receiving section 31 and the retainer 34.

In the above embodiment, the grooved concave portion 54 is exemplified as the engaging portion. The engaging portion may take any shape as long as the retainer 34 is capable of moving along with the pickup head 18. For example, the engaging portion may be shaped into a hole or a projection.

The retainer 34 is made of the polymer material. Alternatively, for example, the retainer 34 may be made of a metal material. In the above embodiment, the body section 50 and the pressing sections 51 are integrally molded. Alternatively, the body section 50 and the pressing sections 51 are formed separately, and then joined together with screws or adhesives. However, it should be noted that the production cost is effectively reduced by molding the polymer material into a single retainer 34, as described in the above embodiment. Other than the leaf spring, for example, a coil spring or rubber may be used for the pressing section 51. One or more than two pressing sections 51 may be used.

The present invention is applied to the sub shaft 41. Alternatively, the present invention may be applied to the main shaft 40 or both the main shaft 40 and the sub shaft 41. Instead of the round rods, rectangular rods may be used for the main and sub shafts 40 and 41.

In the above embodiment, the present invention is applied to the slot-in type disk apparatus. Alternatively, the present invention may be applied to a tray-type disk apparatus. The present invention is applicable to various head driving devices for driving heads, for example, a magnetic head in a hard disk drive, a printer head in a printer such as an inkjet printer, and a scanner head in a scanner.

Various changes and modifications are possible in the present invention and may be understood to be within the present invention.

What is claimed is:

1. A head driving device for reciprocating a head along a guide shaft comprising:
    a shaft receiving section provided in said head, said shaft receiving section having a cutout with a first surface and a second surface for receiving said guide shaft, a distance between said first surface and said second surface being larger than a diameter of said guide shaft; and
    a guide shaft retainer attached to said shaft receiving section, said guide shaft retainer having a body section and a pressing section, said body section having a slide groove to slidably fit to said guide shaft, said pressing section located opposite to said first surface with respect to said guide shaft, said pressing section biasing said shaft receiving section via said body section such that said first surface is pressed against said guide shaft when said pressing section is elastically deformed by said guide shaft.

2. The head driving device of claim 1, wherein said pressing section is provided on each lateral side of said body section.

3. The head driving device of claim 2, wherein said pressing section is a plate projected from said body section, and an end portion of said plate is pushed up by said guide shaft.

4. The head driving device of claim 3, wherein said cutout is opened in a lateral direction, and said slide groove is opened in an up-and-down direction.

5. The head driving device of claim 4, wherein said cutout has a U-shape.

6. The head driving device of claim 4, wherein said body section has a concave portion that engages with said second surface of said cutout.

7. The head driving device of claim 4, wherein said guide shaft retainer is a polymer molded part.

8. A head driving device for reciprocating a head along a guide shaft comprising:
    a shaft receiving section provided in said head, said shaft receiving section having a cutout with a first surface and a second surface for receiving said guide shaft, a distance between said first surface and said second surface being larger than a diameter of said guide shaft; and
    a guide shaft retainer attached to said shaft receiving section, said guide shaft retainer having a body section and a pressing section, said body section having a slide groove to slidably fit to said guide shaft, said pressing section located opposite to said first surface with respect to said guide shaft, said pressing section being elastically deformed upon contact with said guide shaft when said body section enters said cutout in a state that said guide shaft fits into said slide groove, said body section being pressed against said second surface and said first surface being pressed against said guide shaft by elastic force of said elastically deformed pressing section.

9. A disk apparatus for recording and/or reproducing information on a disk by moving a pickup head while said disk is spinned, said disk apparatus comprising:
    a guide shaft for guiding said pickup head;
    a shaft receiving section provided in said pickup head, said shaft receiving section having a cutout with a first surface and a second surface for receiving said guide shaft, a distance between said first surface and said second surface being larger than a diameter of said guide shaft; and
    a guide shaft retainer attached to said shaft receiving section, said guide shaft retainer having a body section and a pressing section, said body section having a slide groove to slidably fit to said guide shaft, said pressing section located opposite to said first surface with respect to said guide shaft, said pressing section biasing said shaft receiving section via said body section such that said first surface is pressed against said guide shaft when said pressing section is elastically deformed by said guide shaft.

* * * * *